（12） United States Patent
Christensen et al.

(10) Patent No.: US 9,484,595 B2
(45) Date of Patent: Nov. 1, 2016

(54) LI/METAL BATTERY WITH COMPOSITE SOLID ELECTROLYTE

(71) Applicant: Robert Bosch GmbH, Stuttgart (DE)

(72) Inventors: John F. Christensen, Mountain View, CA (US); Paul Albertus, Washington, DC (US); Aleksandar Kojic, Sunnyvale, CA (US); Timm Lohmann, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 146 days.

(21) Appl. No.: 14/459,761

(22) Filed: Aug. 14, 2014

(65) Prior Publication Data

US 2015/0050537 A1    Feb. 19, 2015

Related U.S. Application Data

(60) Provisional application No. 61/866,077, filed on Aug. 15, 2013.

(51) Int. Cl.
| | |
|---|---|
| *H01M 2/14* | (2006.01) |
| *H01M 10/052* | (2010.01) |
| *H01M 4/38* | (2006.01) |
| *H01M 10/0562* | (2010.01) |
| *H01M 10/42* | (2006.01) |
| *H01M 4/66* | (2006.01) |
| *H01M 10/0585* | (2010.01) |

(52) U.S. Cl.
CPC ........... *H01M 10/052* (2013.01); *H01M 4/382* (2013.01); *H01M 4/661* (2013.01); *H01M 10/0562* (2013.01); *H01M 10/4235* (2013.01); *H01M 10/0585* (2013.01); *H01M 2300/0068* (2013.01); *H01M 2300/0082* (2013.01); *H01M 2300/0094* (2013.01); *Y02E 60/122* (2013.01); *Y10T 29/49115* (2015.01)

(58) Field of Classification Search
None
See application file for complete search history.

(56) References Cited

U.S. PATENT DOCUMENTS

| | | | |
|---|---|---|---|
| 5,686,201 A * | 11/1997 | Chu | ................... C07C 227/32 429/104 |
| 2003/0162094 A1 | 8/2003 | Lee et al. | |
| 2004/0142244 A1* | 7/2004 | Visco | ...................... C03C 4/18 429/246 |
| 2009/0280410 A1 | 11/2009 | Zaguib et al. | |
| 2011/0086260 A1 | 4/2011 | Kohlberger et al. | |
| 2012/0219842 A1 | 8/2012 | Visco et al. | |

OTHER PUBLICATIONS

International Search Report and Written Opinion corresponding to PCT Application No. PCT/US2014/051066, mailed Nov. 28, 2014 (10 pages).
Christensen, J. et al., A Critical Review of Li/Air Batteries. Journal of The Electrochemical Society, 2012. 159(2): p. R1.

* cited by examiner

*Primary Examiner* — Cynthia K Walls
(74) *Attorney, Agent, or Firm* — Maginot Moore & Beck LLP (57) ABSTRACT

In accordance with one embodiment, an electrochemical cell includes a first anode including a form of lithium a first cathode including an electrolyte, and a first composite electrolyte structure positioned between the first anode and the first cathode, the first composite electrolyte structure including (i) a first support layer adjacent the first anode and configured to mechanically suppress roughening of the form of lithium in the first anode, and (ii) a first protective layer positioned between the first support layer and the first cathode and configured to prevent oxidation of the first support layer by substances in the first cathode.

14 Claims, 5 Drawing Sheets

LI/METAL BATTERY WITH COMPOSITE SOLID ELECTROLYTE

CROSS REFERENCE

This application claims the benefit of U.S. Provisional Application No. 61/866,077 filed Aug. 15, 2013, the entire contents of which is herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices*. Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Previous Li dendrite growth modeling work has shown that the moving front of a dendrite tends to accelerate during cell charge due to the higher current density localized at the dendrite tip relative to its base. Application of thermodynamic models has shown that dendrite initiation (i.e., initial roughening of an almost perfectly smooth surface) can be suppressed by applying mechanical stress and selecting solid electrolytes with shear moduli on the order of 10 GPa at room temperature. The same models indicate that surface tension at metal-fluid interfaces is insufficient to suppress dendrite initiation.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Because of the enormous challenge involved in stabilizing the Li surface chemically and mechanically through the use of electrolyte additives, such that passivation remains in effect over hundreds to thousands of cycles, the preferred treatment for rechargeable Li-based cells is the use of a solid-electrolyte membrane that is mechanically robust and chemically stable against both electrodes. Such a barrier removes several simultaneous constraints that the liquid electrolyte otherwise must satisfy, but the requirements for its properties are nonetheless multifaceted and challenging to obtain in a single material.

The barrier must be chemically stable with respect to some or all of the following: the liquid electrolyte in the positive electrode, electronic conductors and catalysts in the positive electrode, the metallic Li negative electrode, reactive species such as oxygen molecules and reaction intermediates, and (in aqueous cells) water. Solid electrolytes must also have sufficient Li+ conductivity over the operating temperature range of the cell, negligible electronic conductivity, and high elastic modulus to prevent Li dendrite initiation.

In order to reduce formation of lithium dendrites, internal shorts, electrolyte decomposition, and lithium morphology changes, a number of approaches involving solid electrolytes that conduct lithium ions but are electronically insulating have been attempted. One such approach involves the use of a poorly conducting amorphous material known as LiPON, which has been used successfully in thin film lithium-metal batteries. However, because of LiPON's low lithium conductivity, it is difficult to make cells with thick, high capacity electrodes and still maintain a desired rate of discharge.

Another approach involves the use of a block copolymer that includes lithium-conducting channels in a matrix of inactive polymer that has a high shear modulus, perhaps high enough to prevent lithium dendrite formation. This approach has several drawbacks: 1) the composite conductivity is too low at room temperature because the intrinsic conductivity of the conducting phase is low, and the high-shear-modulus phase does not conduct lithium ions, thus diluting the composite conductivity further; 2) polymers generally absorb liquids and therefore are not an effective barrier between lithium metal and liquid electrolytes in the positive electrode or separator; 3) Li-conducting polymers are typically unstable at high positive electrode potentials (>3.9 V vs. Li). Hence, lithium-metal cells with such polymer electrolytes are typically used without any liquid electrolyte in the positive electrode, and they are used with low-potential positive electrode materials, such as sulfur or $LiFePO_4$.

What is needed, therefore, is a battery system that reduces the potential for dendrite formation and the undesired morphological changes in the anode of battery cells having metal anodes, and that enables the use of a high-potential positive electrodes to increase the overall energy density of the battery.

SUMMARY

In accordance with one embodiment, an electrochemical cell includes a first anode including a form of lithium a first cathode including an electrolyte, and a first composite electrolyte structure positioned between the first anode and the first cathode, the first composite electrolyte structure including (i) a first support layer adjacent the first anode and configured to mechanically suppress roughening of the form of lithium in the first anode, and (ii) a first protective layer positioned between the first support layer and the first cathode and configured to prevent oxidation of the first support layer by substances in the first cathode.

In one or more of the embodiments, the protective layer is fully dense.

In one or more of the embodiments the electrolyte in the cathode is a fluid electrolyte.

In one or more of the embodiments the support layer has a volume fraction of ceramic or glass particles of between 0.1 and 99%.

In one or more of the embodiments the support layer includes a block copolymer with a polyethylene oxide (PEO) Li-conducting phase and polystyrene high-shear-modulus phase.

In one or more of the embodiments the protective layer has a maximum width of less than one micron, and the support layer has a maximum width of less than two microns.

In one or more of the embodiments the electrochemical cell includes an aluminum current collector spaced apart from the first composite electrolyte by the first cathode, an inert current collector spaced apart from the first cathode by the aluminum current collector, a second anode including a form of lithium spaced apart from the aluminum current collector by the inert current collector, and a second cathode. Some of these embodiments further include a second composite electrolyte structure positioned between the second anode and the second cathode, the second composite electrolyte structure including (i) a second support layer adjacent the second anode and configured to mechanically suppress roughening of the form of lithium in the second anode, and (ii) a second protective layer positioned between the second support layer and the second cathode and configured to prevent oxidation of the second support layer by substances in the second cathode.

In one or more of the embodiments the electrochemical cell includes a second anode adjacent to the first anode and including a form of lithium, a second cathode, and a second composite electrolyte structure positioned between the second anode and the second cathode, the second composite electrolyte structure including (i) a second support layer spaced apart from the first anode by the second anode and configured to mechanically suppress roughening of the form of lithium in the second anode, and (ii) a second protective layer positioned between the second support layer and the second cathode and configured to prevent oxidation of the second support layer by substances in the second cathode.

In one embodiment, a method of forming an electrochemical cell includes forming a first anode with a form of lithium, forming a first cathode with an electrolyte, forming a first composite electrolyte structure including a first support layer configured to mechanically suppress roughening of the form of lithium in the first anode, and a first protective layer configured to prevent oxidation of the first support layer by substances in the first cathode, and locating the first composite electrolyte structure between the first anode and the first cathode with the first support layer adjacent the first anode and the first protective layer positioned between the first support layer and the first cathode.

In one or more of the embodiments forming the first composite electrolyte structure includes forming the first composite electrolyte structure with a fully dense protective layer.

In one or more of the embodiments forming the first cathode includes forming the first cathode with a fluid electrolyte.

In one or more of the embodiments forming the first composite electrolyte structure includes forming the support layer with a volume fraction of ceramic or glass particles of between 0.1 and 99%.

In one or more of the embodiments forming the first composite electrolyte structure includes forming the support layer using a block copolymer with a polyethylene oxide (PEO) Li-conducting phase and polystyrene high-shear-modulus phase.

In one or more of the embodiments forming the first composite electrolyte structure includes forming the protective layer with a maximum width of less than one micron, and forming the support layer with a maximum width of less than two microns.

In one or more of the embodiments the method includes spacing an aluminum current collector apart from the first composite electrolyte with the first cathode, spacing an inert current collector apart from the first cathode with the aluminum current collector, spacing a second anode including a form of lithium apart from the aluminum current collector with the inert current collector, forming a second cathode, forming a second composite electrolyte structure including (i) a second support layer configured to mechanically suppress roughening of the form of lithium in the second anode, and a second protective layer configured to prevent oxidation of the second support layer by substances in the second cathode, and positioning the second composite electrolyte structure between the second anode and the second cathode with the second support layer adjacent the second anode and the second protective layer positioned between the second support layer and the second cathode.

In one or more of the embodiments the method includes positioning a second anode including a form of lithium adjacent to the first anode, forming a second cathode, forming a second composite electrolyte structure including a second support layer configured to mechanically suppress roughening of the form of lithium in the second anode, and a second protective layer configured to prevent oxidation of the second support layer by substances in the second cathode, and positioning the second composite electrolyte structure between the second anode and the second cathode with the second support layer spaced apart from the first anode by the second anode and the second protective layer positioned between the second support layer and the second cathode.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 1:
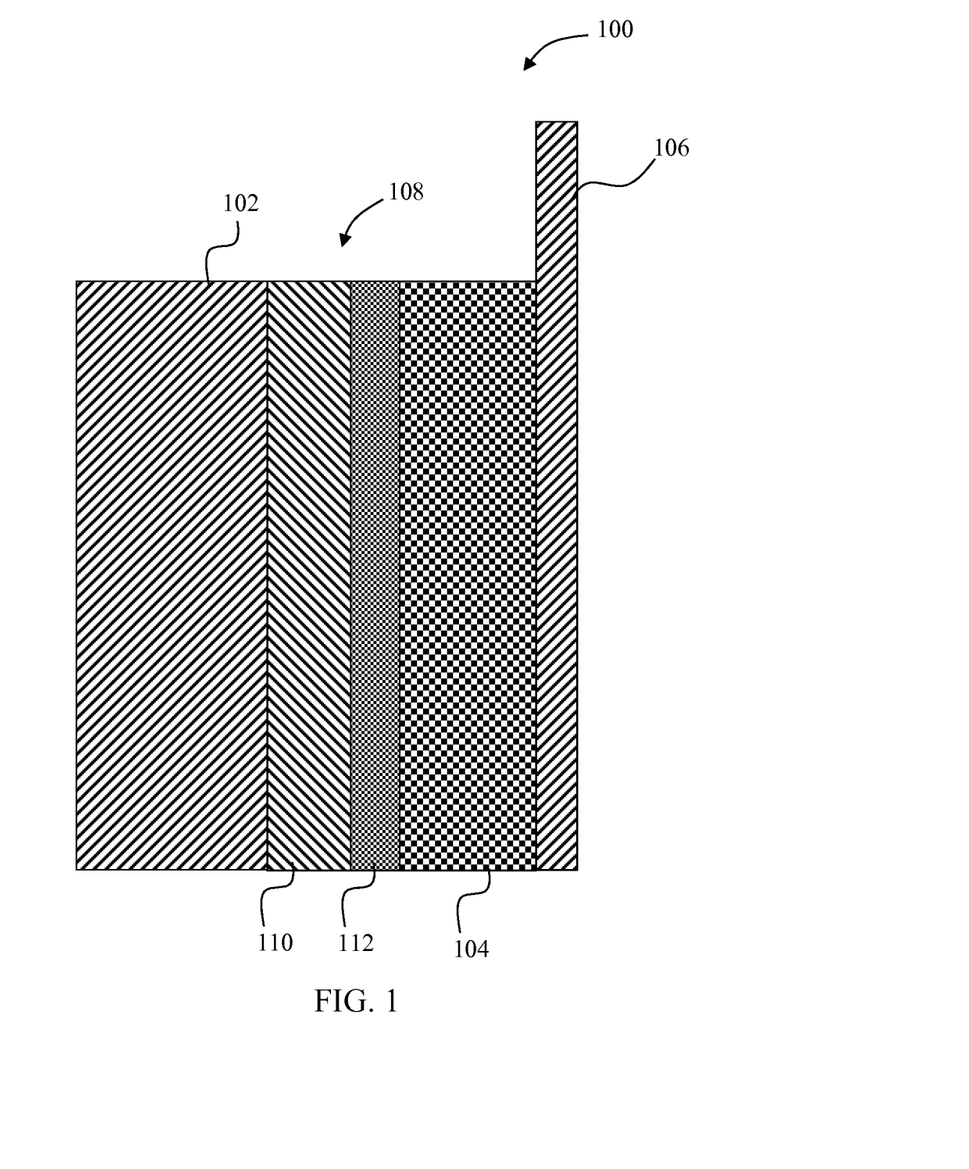
FIG. 1 depicts a simplified schematic of an electrochemical cell including a composite electrolyte structure which inhibits dendrite formation.

FIG. 1 depicts an electrochemical cell 100. The electrochemical cell 100 includes an anode 102, a cathode 104 with an aluminum current collector 106, and a composite electrolyte structure 108. The anode 102 includes lithium metal or a lithium alloy metal. The anode 102 is sized such that it has at least as much capacity as the cathode 104, and preferably at least 10% excess capacity. The Al current collector 106 is typically less than 30 microns in width and preferably less than 15 microns.

The cathode 104 in various embodiments includes a sulfur or sulfur-containing material (e.g., PAN-S composite or $Li_2S$); an air electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials with potential >3.9 V, or blends thereof or any other active material or blend of materials that react with and/or insert Li cations and/or electrolyte anions. In some embodiments, the cathode 104 includes Li-conducting liquid, gel, polymer, or other solid electrolyte. Solid electrolyte materials in the cathode 104 may further include lithium conducting garnets, lithium conducting sulfides (e.g., $Li_2S$—$P_2S_5$) or phosphates, $Li_3P$, LIPON, Li-conducting polymer (e.g., PEO), Li-conducting metal-organic frameworks such as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference, $Li_3N$, $Li_3P$, thio-LISiCONs, Li-conducting NaSICONs, $Li_{10}GeP_2S_{12}$, lithium polysulfidophosphates, or other solid Li-conducting material. Other solid electrolyte materials that may be used are described in Christensen et al., "A critical Review of Li/Air Batteries", Journal of the Electrochemical Society 159(2) 2012, the entire contents of which are herein incorporated by reference. Other materials in the cathode 104 may include electronically conductive additives such as carbon black, and a binder material. The cathode materials are selected to allow sufficient electrolyte-cathode interfacial area for a desired design. The cathode 104 may be greater than 1 micron in thickness, preferably greater than 10 microns, and more preferably greater than 40 microns.

The cathode 104 includes an electrolyte (not shown). The electrolyte in some embodiments is a fluid such as a liquid electrolyte. In other embodiments, a ceramic or other solid, non-polymer electrolyte is used.

The composite electrolyte structure 108 is a solid electrolyte structure that conducts lithium ions between the anode 102 and the cathode 104 while blocking electrons and any liquid electrolyte that may be contained in the cathode 104. There are at least two layers in the composite electrolyte structure 108, including a support layer 110 next to the anode 102 and a protective layer 112 next to the cathode 104. The support layer 110 prevents initiation and/or propagation of lithium dendrites from the anode 102 toward the cathode 104 by mechanically suppressing roughening of the lithium in the anode 102. The support layer 110 is typically less than 50 microns in width, preferably less than 10 microns, and more preferably less than 2 microns. In some embodiments the support layer 110 preferably has a volume fraction of ceramic (or glass) particles of between 0.1 and 99%, preferably between 10 and 50%. The support layer 110 in some embodiments is a block copolymer with a polyethylene oxide (PEO) Li-conducting phase and polystyrene high-shear-modulus phase.

The protective layer 112 is fully dense in embodiments with a fluid electrolyte in the cathode 104. In embodiments which do not include a fluid electrolyte, the protective layer 112 may be porous, or consist of a collection of grains in contact with one another, so long as there is no electronically conductive material in this region. The protective layer 112 may also be fully dense in the absence of a fluid electrolyte in the cathode 104. Embodiments which do not include a fluid electrolyte in the cathode 104 are thus "all-solid-state".

The protective layer 112 sandwiched between the support layer 110 and the cathode 104 prevents oxidation of the support layer 110 by substances in the cathode 104. The protective layer 112 is generally less than 50 microns in width, preferably less than 10 microns, and more preferably less than 1 micron. Materials used in the protective layer 112 may include LiPON, $Li_3P$, Li-conducting garnets, Li-conducting sulfides, and Li-conducting phosphates.

Figure 2:
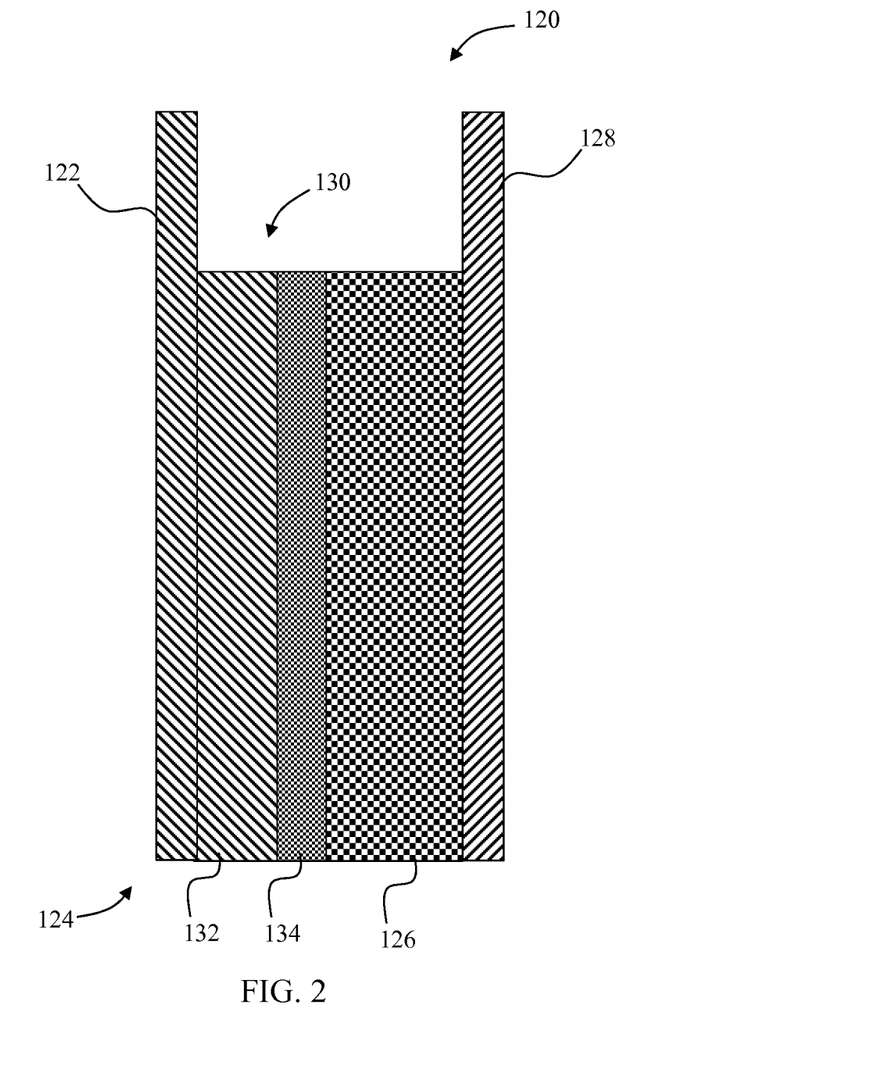
FIG. 2 depicts a simplified schematic of an electrochemical cell including a composite electrolyte structure which inhibits dendrite formation wherein no lithium metal is initially provided in the anode.

While the electrochemical cell 100 depicts the anode 102 populated with lithium, the lithium need not be initially provided in the anode 102. By way of example, FIG. 2 depicts an electrochemical cell 120 which includes a copper current collector 122 in the anode 124. The cell 120 is in other respects similar to the electrochemical cell 100, including a cathode 126 with an aluminum current collector 128, and a composite electrolyte structure 130 including a support layer 132 and a protective layer 134. In this embodiment, the lithium is initially provided, for example, in the active Li-insertion materials of the cathode 126 and lithium metal is formed between the copper current collector 122 and the support layer 132 during the initial charging of the electrochemical cell 120. In a further modification, the electrochemical cell 100 is provided with a current collector under a layer of lithium such as the copper current collector 122.

Figure 3:
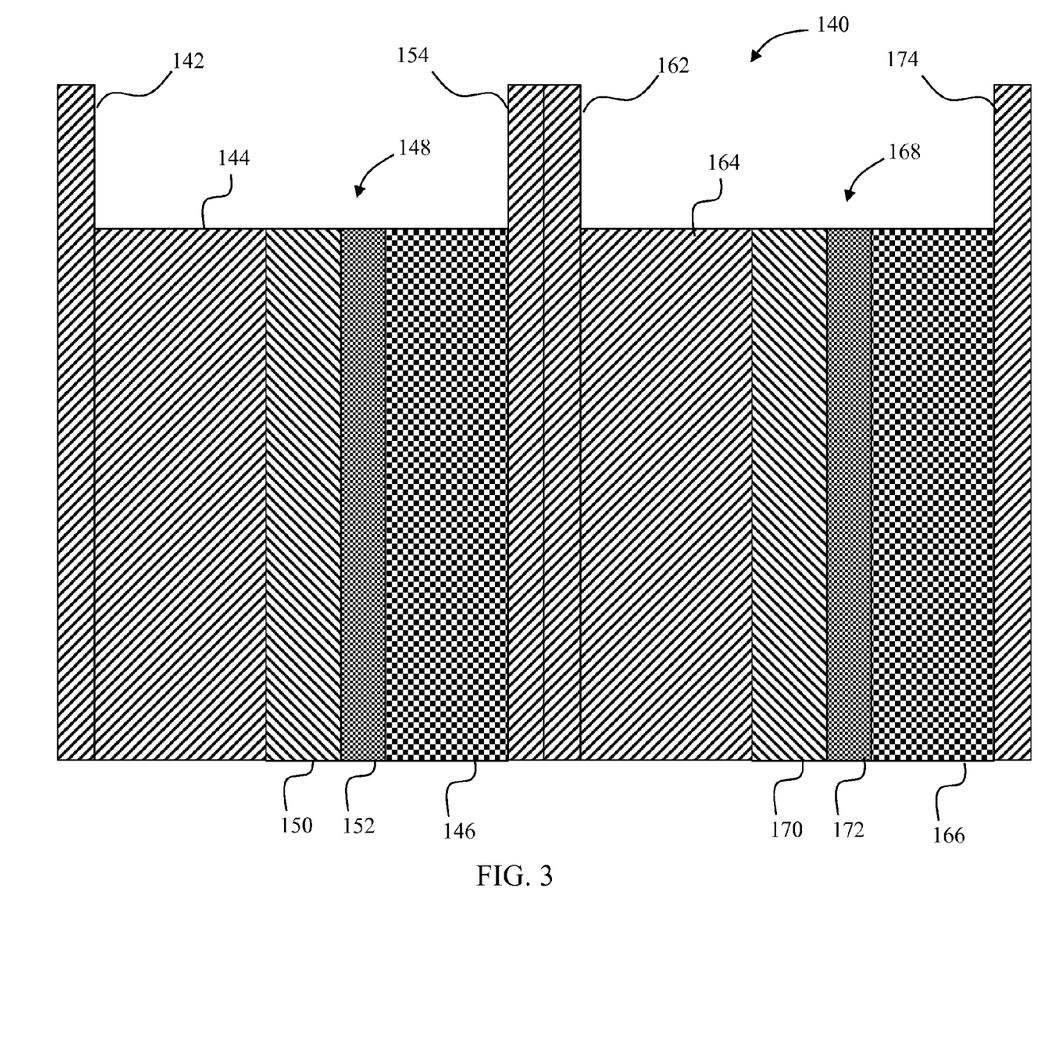
FIG. 3 depicts a simplified schematic of an electrochemical cell including a composite electrolyte structure which inhibits dendrite formation wherein the cell is embodied in a bipolar design.

In one embodiment, the electrochemical cell generally disclosed above is embodied in a bipolar design as depicted in FIG. 3. The electrochemical cell 140 in FIG. 3 includes an inert electrical conductor 142 such as copper. The conductor 142 is next to a lithium anode 144 which is separated from a cathode 146 by a composite electrolyte structure 148. The composite electrolyte structure 148 includes a support layer 150 and a protective layer 152. An aluminum current collector 154 is located next to the cathode 146.

The above described components of the electrochemical cell 140 are substantially identical to the components described above with respect to the electrochemical cell 100 with the addition of the conductor 142 which can be made of any acceptable conductor such as carbon. The bipolar design of the electrochemical cell 140 is reflected in the further addition of an inert conductor 162 next to a lithium anode 164 which is separated from a cathode 166 by a composite electrolyte structure 168. In some embodiments an inert electronic conductor is provided between the current collector 154 and the inert conductor 162 which is of different material from either current collector 154 or the inert conductor 162. For instance, it may be a graphite plate or some other form of carbon, titanium, etc. The composite electrolyte structure 168 includes a support layer 170 and a protective layer 172. An aluminum current collector 174 is located next to the cathode 166. If desired, the pattern of conductors, lithium anodes, cathodes, composite electrolyte structures and current collectors can be repeated.

Figure 4:
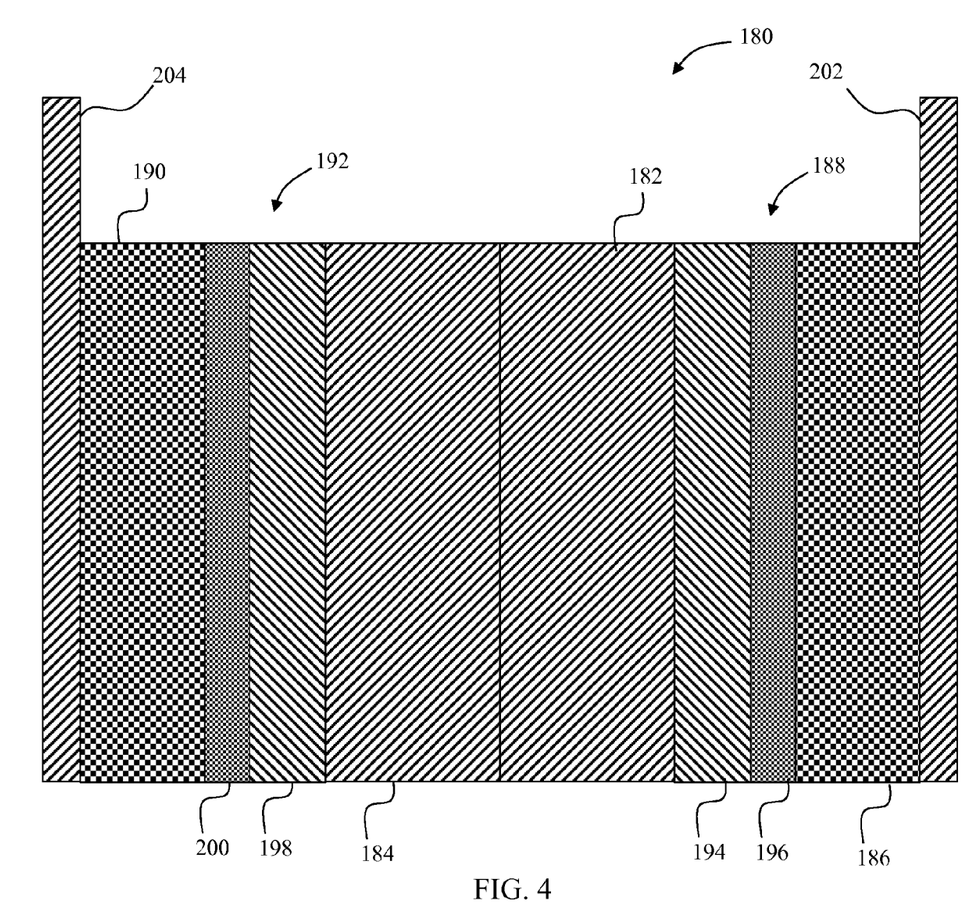
FIG. 4 depicts a simplified schematic of an electrochemical cell including a composite electrolyte structure which inhibits dendrite formation wherein the cell is embodied in a double-sided design.

In another embodiment, the disclosed electrochemical cell is embodied as a double-sided cell. An example of a double-sided electrochemical cell 180 is depicted in FIG. 4. The electrochemical cell 180 includes two lithium anode portions 182 and 184. The lithium anode portion 182 is separated from a cathode 186 by a composite electrolyte structure 188. The lithium anode portion 184 is separated from a cathode 190 by a composite electrolyte structure 192.

The composite electrolyte structure 188 includes a support layer 194 and a protective layer 196 while the composite electrolyte structure 192 includes a support layer 198 and a protective layer 200. Two aluminum current collectors 202 and 204 are positioned adjacent to cathodes 186 and 190, respectively.

The various components in the electrochemical cell 180 are substantially identical with the components of like name described above with respect to the electrochemical cell 100. The main difference is in the arrangement of the components.

A process 210 for forming electrochemical cells such as those described above is depicted in FIG. 5. At block 212, an aluminum foil is provided. The aluminum foil is coated with a slurry at block 214. The slurry is a blend of ceramic powder (e.g., Li-conducting garnet), positive electrode active material (e.g., transition metal oxide), conductive additive (e.g., carbon black), binder (e.g., PVDF), and sacrificial solvent (e.g., NMP). The cathode is then formed from the aluminum coated slurry (block 216). Formation of the cathode in some embodiments is accomplished simply by allowing the solvent to evaporate. Evaporation in some embodiments is assisted by use of a heated coater and/or an infrared heater. In some embodiments, forming the cathode includes densifying the slurry coated aluminum foil using a roll press or other source of pressure possibly in the presence of heat.

Figure 5:
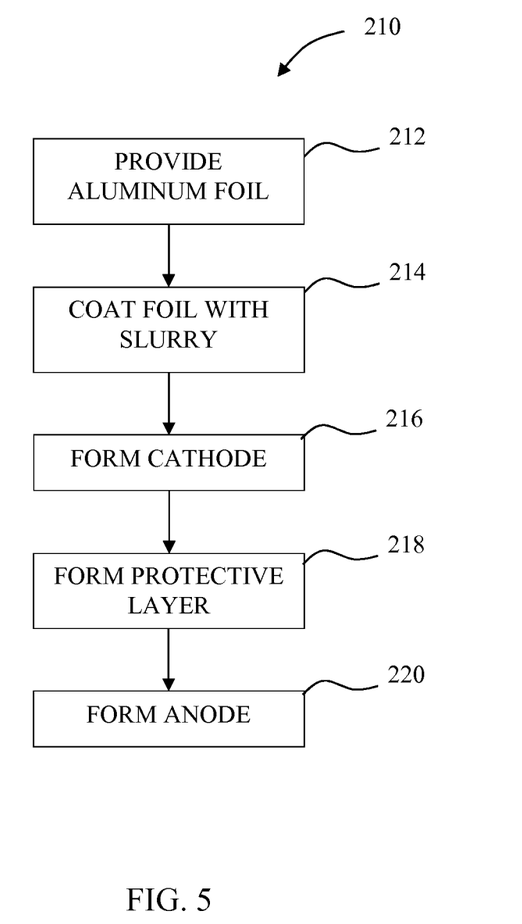
FIG. 5 depicts a flow diagram of an exemplary procedure that may be performed to produce electrochemical cells including a composite electrolyte structure which inhibits dendrite formation.

Next, the protective layer is formed by coating a second slurry consisting only of the selected ceramic powder and solvent on top of the formed cathode (block 218). The solvent is then evaporated and the resulting coating is optionally densified to finally form the protective layer.

Finally, the anode is formed (block 220). Formation of the anode includes sandwiching a polymer layer in between the aluminum foil/cathode/protective layer formed above and the Li metal negative electrode. For all-solid-state embodiments, the cell is then substantially complete.

The above described process 210 can be modified to form the other embodiments of electrochemical cells disclosed herein as well as other variants. For example, a process for formation of the electrochemical cell 120 is substantially identical to the process 210 except that no Li metal is required when making the cell. In this variation, the polymer is sandwiched between the aluminum foil/cathode/protective layer and a copper foil. The Li metal will be generated in the anode between the polymer and Cu foil during the first charging of the battery.

The above described embodiments thus provide a composite electrolyte structure which has an additional layer of porous or fully dense lithium-conducting ceramic (or glass, or other crystalline or amorphous solid lithium-ion conductor) situated between a layer of polymer (or block copolymer) and the positive electrode. This additional layer prevents decomposition of the polymer layer at high positive electrode potentials (>3.9 V). There may be additional layers between the ceramic and the positive electrode (e.g., a porous polymer "separator" that contains electrolyte in its pores). In these other embodiments, the polymer layer is in contact with Li metal and the ceramic (or other solid) layer is situated between the polymer layer and the positive electrode such that the polymer layer is not exposed to high potentials during cell operation, and therefore polymer decomposition is avoided.

An electrochemical cell in accordance with the above described embodiments allows for battery operation at lower temperatures (e.g., between −40 and 70° C.) without excessive degradation of the cell. Additionally, aging mechanisms such as lithium dendrites, lithium morphology change, internal shorts, and liquid electrolyte decomposition are reduced.

The disclosed embodiments also provide favorable mechanical properties (e.g., flexibility, high shear modulus) while exhibiting low contact resistance between the lithium metal and the solid electrolyte (polymers adhere better than ceramics).

The disclosed embodiments enable the use of positive electrode materials with high potential vs. Li (e.g., Li-rich NCM, NCA, $LiMnPO_4$, $LiMn_2O_4$, and other Li intercalation materials with potential >3.9 V, or blends thereof). Consequently, the disclosed embodiments provide high specific energy and specific power.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical cell, comprising:
   a first anode including a form of lithium;
   a first cathode including an electrolyte; and
   a first composite electrolyte structure positioned between the first anode and the first cathode, the first composite electrolyte structure including (i) a first support layer adjacent the first anode and configured to mechanically suppress roughening of the form of lithium in the first anode, and (ii) a first protective layer positioned between the first support layer and the first cathode and configured to prevent oxidation of the first support layer by substances in the first cathode, wherein the electrolyte in the cathode is a fluid electrolyte.

2. The electrochemical cell of claim 1, wherein the protective layer is fully dense.

3. An electrochemical cell, comprising:
   a first anode including a form of lithium;
   a first cathode including an electrolyte; and
   a first composite electrolyte structure positioned between the first anode and the first cathode, the first composite electrolyte structure including (i) a first support layer adjacent the first anode and configured to mechanically suppress roughening of the form of lithium in the first anode, and (ii) a first protective layer positioned between the first support layer and the first cathode and configured to prevent oxidation of the first support layer by substances in the first cathode, wherein the support layer comprises a block copolymer with a polyethylene oxide (PEO) Li-conducting phase and polystyrene high-shear-modulus phase.

4. The electrochemical cell of claim 3, wherein the support layer has a volume fraction of ceramic or glass particles of between 0.1 and 99%.

5. The electrochemical cell of claim 3, wherein:
   the protective layer has a maximum width of less than one micron; and
   the support layer has a maximum width of less than two microns.

6. The electrochemical cell of claim 5, further comprising:
   an aluminum current collector spaced apart from the first composite electrolyte by the first cathode;
   an inert current collector spaced apart from the first cathode by the aluminum current collector;
   a second anode including a form of lithium spaced apart from the aluminum current collector by the inert current collector;
   a second cathode; and
   a second composite electrolyte structure positioned between the second anode and the second cathode, the second composite electrolyte structure including (i) a second support layer adjacent the second anode and configured to mechanically suppress roughening of the form of lithium in the second anode, and (ii) a second protective layer positioned between the second support layer and the second cathode and configured to prevent oxidation of the second support layer by substances in the second cathode.

7. The electrochemical cell of claim 5, further comprising:
   a second anode adjacent to the first anode and including a form of lithium;
   a second cathode; and
   a second composite electrolyte structure positioned between the second anode and the second cathode, the second composite electrolyte structure including (i) a second support layer spaced apart from the first anode by the second anode and configured to mechanically suppress roughening of the form of lithium in the second anode, and (ii) a second protective layer positioned between the second support layer and the second cathode and configured to prevent oxidation of the second support layer by substances in the second cathode.

8. A method of forming an electrochemical cell, comprising:
   forming a first anode with a form of lithium;
   forming a first cathode with an electrolyte;
   forming a first composite electrolyte structure including a first support layer configured to mechanically suppress roughening of the form of lithium in the first anode, and a first protective layer configured to prevent oxidation of the first support layer by substances in the first cathode; and
   locating the first composite electrolyte structure between the first anode and the first cathode with the first support layer adjacent the first anode and the first protective layer positioned between the first support layer and the first cathode, wherein forming the first cathode comprises:
   forming the first cathode with a fluid electrolyte.

9. The method of claim 8, wherein forming the first composite electrolyte structure comprises:
   forming the first composite electrolyte structure with a fully dense protective layer.

10. A method of forming an electrochemical cell, comprising:
    forming a first anode with a form of lithium;
    forming a first cathode with an electrolyte;
    forming a first composite electrolyte structure including a first support layer configured to mechanically suppress roughening of the form of lithium in the first anode, and a first protective layer configured to prevent oxidation of the first support layer by substances in the first cathode; and
    locating the first composite electrolyte structure between the first anode and the first cathode with the first support layer adjacent the first anode and the first protective layer positioned between the first support layer and the first cathode, wherein forming the first composite electrolyte structure comprises:
    forming the support layer using a block copolymer with a polyethylene oxide (PEO) Li-conducting phase and polystyrene high-shear-modulus phase.

11. The method of claim 10, wherein forming the first composite electrolyte structure comprises:
    forming the support layer with a volume fraction of ceramic or glass particles of between 0.1 and 99%.

12. The method of claim 10, wherein forming the first composite electrolyte structure comprises:
    forming the protective layer with a maximum width of less than one micron; and
    forming the support layer with a maximum width of less than two microns.

13. The method of claim 12, further comprising:
    spacing an aluminum current collector apart from the first composite electrolyte with the first cathode;
    spacing an inert current collector apart from the first cathode with the aluminum current collector;

spacing a second anode including a form of lithium apart from the aluminum current collector with the inert current collector;

forming a second cathode;

forming a second composite electrolyte structure including (i) a second support layer configured to mechanically suppress roughening of the form of lithium in the second anode, and a second protective layer configured to prevent oxidation of the second support layer by substances in the second cathode; and positioning the second composite electrolyte structure between the second anode and the second cathode with the second support layer adjacent the second anode and the second protective layer positioned between the second support layer and the second cathode.

14. The method of claim 12, further comprising:

positioning a second anode including a form of lithium adjacent to the first anode;

forming a second cathode;

forming a second composite electrolyte structure including a second support layer configured to mechanically suppress roughening of the form of lithium in the second anode, and a second protective layer configured to prevent oxidation of the second support layer by substances in the second cathode; and positioning the second composite electrolyte structure between the second anode and the second cathode with the second support layer spaced apart from the first anode by the second anode and the second protective layer positioned between the second support layer and the second cathode.

* * * * *